United States Patent [19]

Schilling et al.

[11] Patent Number: 4,806,166
[45] Date of Patent: Feb. 21, 1989

[54] TALL OIL BASED AMINO ESTERS AS ANTI-STRIPPING AGENTS FOR ASPHALT

[75] Inventors: Peter Schilling; Hans G. Schreuders, both of Charleston, S.C.

[73] Assignee: Westvaco Corporation, New York, N.Y.

[21] Appl. No.: 97,687

[22] Filed: Sep. 17, 1987

[51] Int. Cl.$^4$ .................... C08L 95/00; C09D 3/24
[52] U.S. Cl. ..................... 106/284.06; 106/284.4; 208/44
[58] Field of Search .......... 106/281 N, 273 N, 273 R, 106/277; 208/44

[56] References Cited

U.S. PATENT DOCUMENTS

| | | | |
|---|---|---|---|
| 3,114,649 | 12/1963 | Katz | 106/273 N |
| 3,249,451 | 5/1966 | Evans et al. | 106/273 N |
| 3,607,773 | 9/1971 | Pitchford et al. | 106/277 |
| 4,450,011 | 5/1984 | Schilling et al. | 106/273 N |
| 4,478,642 | 10/1984 | Schilling et al. | 106/273 N |
| 4,494,992 | 1/1985 | Schilling et al. | 106/273 N |

FOREIGN PATENT DOCUMENTS 617466 2/1949 United Kingdom ........... 106/273 N

Primary Examiner—Paul Lieberman
Assistant Examiner—Helene Kirschner
Attorney, Agent, or Firm—Terry B. McDaniel; Richard L. Schmalz

[57] ABSTRACT

An asphalt composition is disclosed having improved adhesion to aggregate comprising asphalt and an adhesion improving amount of an anti-stripping agent comprising the aminoester reaction product of at least one tall oil fatty acid and triethanolamine.

12 Claims, No Drawings

TALL OIL BASED AMINO ESTERS AS ANTI-STRIPPING AGENTS FOR ASPHALT

BACKGROUND OF THE INVENTION

1. Field of the Invention

This invention relates to the field of asphalt compositions, particularly compositions containing cationic substances which improve the adhesion of the asphalt to mineral aggregate.

2. Description of the Prior Art

In road construction, bitumen-aggregate mixtures are applied to the road surface. These bitumen-aggregate mixtures can be obtained by mixing anionic or cationic asphalt emulsions with aggregate, such as stone chips, gravel or sand, or by mixing free flowing heated asphalt (asphalt cement) with pre-dried aggregate, by a hot mix process. The pre-dried aggregate can also be mixed with asphalt diluted with a hydrocarbon solvent, known as cutback asphalt.

The quality of the road surface is generally dependent upon the strength of the bonds between the asphalt and aggregate after setting of the composition. Poor service performance is due to poor adhesion between the asphalt and aggregate, resulting in the stripping off of the asphalt from the aggregate surface.

Asphalt compositions have relatively poor adhesion to aggregate in the presence of water. Since the aggregate is preferentially wetted by water, even if the aggregate is dry at the time it is blended with the asphalt, the eventual penetration of water into the composition reaches the aggregate and interferes with the bond between the aggregate and the asphalt. The result of this stripping is flaked pavement and pot holes. Stripping problems also generally occur if the aggregate is poorly dried, if sandy carbonate aggregate containing a large amount of quartz particles is used, if carbonate aggregate is covered with dust or if igneous (silicate) aggregates, such as granite, diorite, gabbro, diabase, or basalt, that strip in the presence of external water are used.

To avoid such failures, adhesion improving agents known as "anti-stripping agents" are commonly added to the asphalt. Before the mixing operation, these agents are added to the bituminous binder to reduce its surface tension and to induce on the binder an electrical charge opposite to that of the aggregate surface. Lower surface tension gives improved wettability of the aggregate and charge reversal enhances bond strength by increasing Coulomb's attractive forces.

Cationic substances, particularly amines, have been traditionally used as anti-stripping agents. The cationic substances increase the hydrophobicity of the aggregate, making the aggregate resistant to the penetration of water so that water seeping into the asphalt does not tend to destroy the bond between the asphalt and the aggregate. The addition of the cationic substances tends to make the aggregate sufficiently water resistant that a good bond with the asphalt is formed. Among the cationic materials which have been used as adhesion promoters with asphalt are primary alkyl amines such as lauryl amine and stearyl amine, and the alkylene diamines, such as the fatty alkyl substituted alkylene diamines. Because these amines rapidly lose their activity when combined with asphalt and stored at elevated temperatures for an extended period, it has therefore been necessary to combine the amine with the asphalt at the work site when the asphalt is combined with the aggregate, which in practice presents problems in obtaining a homogeneous mixture. There is also a danger since these amines are corrosive.

The patent literature sets forth a large number of compounds which can be used to improve adhesion of aggregate and asphalt. These include fatty carboxylic chromites (U.S. Pat. No. 3,963,059), combinations of epoxy resins and onium borates (U.S. Pat. No. 3,947,395), and ether amines in combination with alkanolamines (U.S. Pat. No. 3,928,061). U.S. Pat. No. 3,868,263 discloses a method of making a paving composition where the adhesion promoter is a primary, secondary, teritary or quaternary amine or imidazoline, or reaction product of these with various acids including fatty acids, metal soaps, and several other compounds including rosin reaction products. Also known are ethylene oxides condensates of long chain alkyl triamines (U.S. Pat. No. 3,615,797), alkoxylated fatty amines and their salts (U.S. Pat. No. 3,347,690) and reaction products of ozonized unsaturated fatty acids with polyalkylene amines (U.S. Pat. Nos. 3,246,008 and 3,245,451).

One promising class of compounds used as adhesion promoters are aminoamines formed from the reaction of tall oil fatty acid fractions and inexpensive polyamines. Since these low cost polyamines are scarce, the commercial potential of these materials is quite limited.

A fatty aminoester has also become available for use as an adhesion promoter under the name PAVEBOND AP sold by Carstab. This produce has low amine value (AV=56) and low viscosity. Low viscosity is important in adhesion promoting agents, since no fuel oil or other diluent need be added in order to effectively mix the adhesion promoter and the asphalt.

SUMMARY OF THE INVENTION

It is the object of the present invention to provide an asphalt composition of improved adhesion to aggregate.

It is a further object of the present invention to provide an asphalt composition with an anti-stripping agent formed from low cost and easily available materials.

It is an additional object of the present invention to provide an asphalt composition having an anti-stripping agent of low viscosity.

To achieve these and other objects, the present invention provides an asphalt composition having improved adhesion to aggregate comprising asphalt and an adhesion improving amount of the aminoester reaction product of tall oil and triethanolamine.

Triethanolamine is an inexpensive amine which is easily available and which easily reacts with tall oil to produce aminoesters.

DETAILED DESCRIPTION OF THE INVENTION

In contrast to polyethylene amines, triethanolamine:

which is obtained by ethoxylation of ammonia, has only one nitrogen which is tertiary in nature. Except for salt formation to give triethanolammonium salts, this nitrogen is nonreactive when fatty acids are heated with triethanolamine. Instead, mono, di-, and triesters are formed upon heating in the presence of excess fatty acid, according to the following reaction:

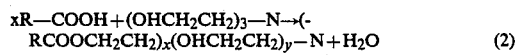

where x=1-3, y=0-2, x+y=3,
and R is a long chain saturated or unsaturated fatty acid radical.

Compared to amidoamines and diamidoamines, which are obtained by reacting fatty acids with polyamines, the fatty aminoesters are more fluid. Amidoamines and diamidoamines often have the consistency of paste or high viscosity liquids.

For anti-stripping agents, the presence of a basic nitrogen is essential. In the case of the amidoamines, one or two nitrogens per polyamine molecule are actually wasted by amide bond formation. The amide nitrogen is neutral and does not contribute to the basicity of the molecule.

The aminoesters of the invention are generally stable when added directly to hot asphalt. Stability is usually only a problem if the asphalt is emulsified in solutions of low pH since ester bonds undergo hydrolytic cleavage more readily than, for example, amide bonds.

The fatty acids used for reaction with triethanolamine are those derived from tall oil, which is a by-product of the wood pulp industry and is recovered from the black liquor of the sulfate or Kraft pulping process. Tall oil fatty acids are chiefly oleic, 9-octadecenoic acid, and linoleic, 9,12-octadecendioic acid. The fatty acids are reacted with triethanolamine in a conventional ester reaction, such as by mixing the reactants in stoichiometric quantities in a flask at 25° to 50° C., and slowly heating to 200°-250° C., while collecting reaction water in a trap. Heating is stopped after water formation is ceased and viscosity and amine value are determined.

The adhesion promoting agents of the invention are useful by themselves, and also in combination with other adhesion promoting agents such as amidoamines. These combinations may be prepared by reacting the fatty acid with a mixture of triethanolamine and polyamines, or by reacting the triethanolamine and polyamines separately with the fatty acids, and mixing the reaction products. By mixing reaction products, agents of lower viscosity are generally obtained. Another anti-stripping agent can be obtained by reacting the fatty acids with a blend of triethanolamine and triethylene glycol to produce a product having low viscosity and good coating performance.

The amount of anti-stripping agent used with the asphalt will vary, but will generally be in a range of about 0.1 to 2%, based on the weight of the asphalt or asphalt emulsion. 0.5 to 1% is generally the preferred range. The amount of mineral aggregate used will be the amount generally used in conjunction with asphalt, typically 80 to 95% by weight of the total composition.

EXAMPLES

In the following examples, asphalt compositions containing asphalt and an anti-stripping agent are prepared by mixing 251 grams of aggregate and 19 grams of treated asphalt cement, a proportion equivalent to 7% by weight asphalt. Mixing temperatures conform to ASTM D-1559-76 (AASHTO standard T-245). The mixing temperature or the temperature to which the asphalt cement is heated to produce a viscosity of 280±30 centistokes shall be the compacting temperature. The laboratory standard aggregate is an aggregate known to have a history of stripping problems, and the laboratory standard asphalt is the viscosity grade 20 (AC-20) asphalt cement normally used in the laboratory for mix design purposes. A "F" mix is prepared in which the aggregate is graded within ±2 percentage points of that shown for each sieve in the following Table:

| SIZE IN INCHES | PASSING PERCENT |
|---|---|
| ½ | 100 |
| ⅜ | 95 |
| ¼ | 65 |
| ⅛ | 47 |
| 1/50 | 20 |
| 1/200 | 7 |

The asphalt cement which is AC-20 in the following examples, is heated to 325° F. and 0.5% by weight of the additive is thoroughly mixed in. The cement plus additive is maintained at 325° F. until all stripping tests have been performed. The initial stripping test is performed within ten minutes after the treatment, a second test is performed after 24 hours, and the final stripping test is performed after 96 hours.

The amount of treated asphalt cement initially prepared should be adequate but should not exceed the quantity that can be properly mixed. In most cases, 900 grams of asphalt cement and 4.5 grams of additive is adequate.

The prepared mix of cement and aggregate is placed in a container of boiling water and allowed to continue boiling for ten minutes. The water is then drained off and the mix is dumped on a paper towel and remains at ambient temperature until dry, without moving or stirring. The mix is then visually inspected; a stripped particle is considered to be one that visually appears to have the asphalt cement totally or partially removed. The visual inspection results are reported to the nearest 5% for each of the initial, 24 hours, and 96 hour tests.

Because of the variety of crude sources, which results in changes to the chemical and physical consistency of the asphalt, coating results can change drastically when a different asphalt, aggregate or evaluation test is used. In Examples 1 through 5 below, the anti-stripping agents are evaluated with AC-20 asphalt from the Young Refinery, Atlanta, Ga., which is the standard laboratory asphalt used by the Georgia DOT Laboratory for evaluation of anti-stripping agents. The aggregate used is 50% M-10 screening, 50% No. 89 stone from Davidson Mineral Properties, Lathonia, Ga., which is a silicious type, granite aggregate.

The aminoesters are prepared by mixing the fatty acid and alkanolamine in a reaction flask at 25° to 50° C., and slowly heating to 200°-250° C., while collecting reaction water in a Dean Stark trap. Heating is stopped after water formation ceases, and amine value is determined.

Example 1

A number of anti-stripping agents prepared by the reaction of tall oil fatty acids with triethanolamine are tested against a commercially available low viscosity product. The results are set forth below in Table I:

TABLE I

Anti-stripping Agents Based on Tall Oil Acids and Triethanolamine

| Anti-Stripping Additive | Amine Value | Percent Coating 0.5% | 1.0% Dosage |
|---|---|---|---|
| COMMERCIAL PRODUCT | 75 | 70–75 | 75–80 |
| Liqrene D[a]- Triethanolamine | | | |
| 1.5:1 (W/W) | 151.2 | — | 80 |
| 3:1 (W/W) | 81.2 | — | 75 |
| 4:1 (W/W) | 78.0 | 70–75 | 80–85 |
| 5:1 (W/W) | 60.0 | 70–75 | 75–80 |
| Liqro W[b]-Triethanolamine 2:1(W/W) | 131.3 | — | 80–85 |
| Crude Tall Oil-Triethanolamine 2:1(W/W) | 113.3 | — | 80–85 |
| L-5[c]-Triethanolamine | | | |
| 1.87:1 (W) | 137.4 | — | 75–80 |
| 2.8:1 (W) | 75.7 | — | 70–75 |
| 4.66:1 (W) | 19.6 | — | 75 |
| 1483[d]-Triethanolamine 4.66:1(W/W) | 25.8 | 50 | 80 |

[a]Liqrene D: Tall oil fatty acid heads.
[b]Liqro W: Blend of tall oil fatty acid heads and bottoms.
[c]L-5: Tall oil Fatty Acid (Westvaco), conjugated linoleic acid and oleic acids.
[d]1483: Tall Oil Fatty Acid (Westvaco), oleic and elaidic acids.

The results above show that in general, the results obtained from the TEA tall oil acid esters are comparable to that of the commercial product.

EXAMPLE 2

Tests are carried out by reacting tall oil fatty acids with mixtures of triethanolamine and various polyamines. The results are set forth in Table II below:

TABLE II

Anti-stripping Agents Based on Reaction Products of Tall Oil Acids and Blends of Triethanolamine and Polyamines

| Anti-stripping Additive | Amine Value | Percent Coating 0.5% | 1.0% Dosage |
|---|---|---|---|
| Liqrene D - (TEA/AEP[a],1:1)2:1(W/W) | 179 | 75–80 | 95 Glossy |
| 4:1 (W/W) | 108.3 | 70–75 | 70–75 |
| Liqrene D - (TEA/AEP,2:1)4:1(W/W) | 75.7 | 70–75 | — |
| Liqro W-(TEA/AEP,1:1)2:1 | 161 | — | 90–95 Glossy |
| 2:1 (W/W) | 157.6 | 75–80 | 90–95 Glossy |
| Liqrene D - (TEA/G-100[b],1:1)2:1(W/W) | 184 | — | 80–85 |
| 4:1(W/W) | 119.5 | — | 80–85 |
| Liqrene D - (TEA/AL-7[c],1:1)2:1(W/W) | 111 | — | 80–85 |
| 4:1(W/W) | 75.1 | — | 80–85 |
| Liqro W - (TEA/AL-7B,[d]1:1)2:1(W/W) | 151 | — | 85–90 Slightly Gloss |
| Liqro W - (TEA/AL-7B,1:3)2:1(W/W) | 157 | — | 85–90 Slightly Gloss |
| Liqrene D - (TEA/Polyamine H-Special[e], 1:1) 4:1(W/W) | 142 | — | 85–90 |
| | 142 | — | 85–90 |
| M28B[f]- (TEA/AEP,1:1)2:1 (W/W) | 137.4 | — | 85–90 Slightly Glossy |

[a]AEP: aminoethyl piperazine (Union Carbide);
[b]G-100:20% diethylene triamine, 80% aminoethyl piperazine (Dow);
[c]AL-7: polyamine bottoms product (Jefferson);
[d]AL-7B: polyamine bottoms product (Jefferson);
[e]PAHS: polyamine bottoms product (Union Carbide);
[f]M28B; Tall oil fatty acid/rosin blend (Westvaco)

While the results above show generally excellent properties at a 1% additive level, the reaction products are generally of much higher viscosity than those of Example 1.

Example 3

As a comparison, tests were carried out with anti-stripping agents which are reaction products of tall oil acids and N,N-dimethylethanolamine. In initial experiments, the tall oil fatty acid is mixed with the alkanolamine in a ratio of 3:1 and 4:1 parts. By heating this mixture 170° C. most of the amine distills from the mixture before ester formation occurs. The fatty acid to alkanolamine ratio is then increased to 7:1, at which ratio fatty acid is by far in excess, and no alkanolamine distills from the reaction mixture. The final reaction products, which are blends of fatty acids with fatty acid salts of the aminoesters, are very fluid. The results of testing with these materials are set forth in Table III:

TABLE III

Anti-stripping Agents Based on Reaction Products of Tall Oil Acids and N,N—Dimethylethanolamine

| Anti-stripping Additive | Amine Value | Percent Coating 0.5% Dosage | 1.0% Dosage |
|---|---|---|---|
| Liqrene D - Dimethylethanolamine 7:1(W/W) | 86.3 | 65 | 60–65 |

TABLE III-continued
Anti-stripping Agents Based on Reaction Products of Tall Oil Acids and N,N—Dimethylethanolamine

| Anti-stripping Additive | Amine Value | Percent Coating 0.5% Dosage | Percent Coating 1.0% Dosage |
|---|---|---|---|
| Liqro W - Dimethylethanolamine 7:1(W/W) | 168.3 | — | 65–70 |
| 1483 - Dimethylethanolamine 7:1(W/W) | 109.9 | — | — |
| L-5 - Dimethylethanolamine 7:1(W/W) | 86.4 | — | 60–65 |
| M28B - Dimethylethanolamine 7:1(W/W) | 88.6 | 65 | 70–75 |
| T-3 - Rosin(1:1) - Dimethylethanolamine 7:1(W/W) | 81.3 | — | 70–75 |
| Liqro W - Dimethylethanolamine - Triethanolamine 4:0.5:0.5(W/W/W) | 102.2 | — | 60–65 |

It can be seen from Table III that the performance of the 7:1 reaction products is generally inferior at the 1% dosage to TEA reaction products. This 7:1 reaction product is thought to be roughly a 1:1 blend of salt of the aminoester and fatty acid.

Example 4

Anti-stripping agents are prepared by blending a triethanolamine-fatty acid reaction product with other fatty aminoesters or aminoamines. In Table IV below, component A is the TEA reaction product, which is blended with the other reaction product shown:

TABLE IV
Anti stripping Agents Prepared by Blending Liqrene D - Triethanolamine 5:1 (A) With Other Fatty Aminoesters or Amidoamines

| Anti-stripping Additive | Percent Coating 1.0% Dosage |
|---|---|
| 50% A - 50% [Liqrene D - AL 7, 4:1] | 75–80 |
| 50% A - 50% [Liqrene D (TEA/AEP,1:1),2:1] | 85–90 Shiny |
| 50% A - 50% [Liqro W - (TEA/AEP,1:1),2:1] | 80–85 |
| 50% A - 50% [Liqro W - (TEA/AL-7B,1:1),2:1] | 75–80 |
| 50% A - 50% [Liqro W - AL 7B, 4:1] | 80–85 |

The products obtained according to this method generally have low viscosity and provided good results at the 1% dosage.

Example 5

Testing is carried out on a number of anti-stripping agents prepared by reaction of fatty acids with various amines. It is noted that the final agent in the table is the reaction product of fatty acids with a mixture of triethanolamine and triethyleneglycol which gives good performance in a low viscosity product.

TABLE V
Miscellaneous Anti-stripping Agents

| Anti-stripping Additive | Amine Value | Percent Coating 0.5% | Percent Coating 1.0% Dosage |
|---|---|---|---|
| Liqro $W^{(a)}$-$AEP^{(b)}$2:1 (W/W) | 219.3 | — | 90–95(Slightly Glossy) |
| Liqro $W^{(a)}$-AL-$7B^{(c)}$4:1 (W/W) | 104.9 | 75–80 | 75–80(Slightly Glossy) |
| Liqrene D - AL-$7B^{(c)}$4:1 (W/W) | 115.6 | 85 | 80–85 |
| Liqrene D - AL-$7^{(c)}$4:1 (W/W) | 103.2 | 70–75 | 85–90 (Glossy) |
| Liqrene D - $HEP^{(d)}$-Mixture | 114.4 | — | 75 |
| Liqrene D - N,N—Dimethylethanolamine - 1 $PO^{(e)}$3:1 (W/W) | 100 | — | 50 |
| Liqrene D - $CH_3NH_2$-2 $PO^{(f)}$2:1 (W/W) | 130.1 | — | 60 |
| Liqrene D - $CH_3NH_2$-2 $PO^{(f)}$/AEP(50:50)2:1(W/W) | 121.2 | — | 80–85(Slightly Glossy) |
| Liqrene D - EDA - 2 $PO^{(g)}$3:1 (W/W) | 132.3 | — | 85–90(Slightly Glossy) |
| M28B - AEP - 1 $PO^{(h)}$2:1 (W/W) | 249.4 | — | 65–70(Slightly Glossy) |
| Liqro $W^{(a)}$ - (TEA/$TEG^{(i)}$, 1:1)2:1 | 110 | — | 85–90 |

$^{(a)}$Liqro W: Blend of tall oil fatty acid heads and bottoms.
$^{(b)}$AEP: aminoethyl piperazine (Union Carbide);
$^{(c)}$AL-7, AL-7B polyamine bottoms (Jefferson);
$^{(d)}$HEP: Hydroxyethyl piperazine blend (Union Carbide);
$^{(e)}$1 mol N,N—dimethyl ethanolamine reacted with 1 mol propylene oxide;
$^{(f)}$1 mol dimethylamine reacted with 2 moles propylene oxide;
$^{(g)}$1 part ethylene diamine reacted with 2 parts propylene oxide (W/W);
$^{(h)}$1 part aminoethyl piperazine reacted with 1 part propylene oxide (W/W); and
$^{(i)}$TEG: triethylene glycol.

Example 6

Further testing is carried out with a different sample of Young AC-20 asphalt and two different aggregates received from the Tennessee DOT Laboratory. These aggregates are crushed limestone and crushed silicious river gravel and both samples are washed and screened, passing a half inch screen and retained on a number 4 sieve.

A 10 minute boiling test is carried out as described above. In addition, an immersion test is carried out in which the coated aggregate is immersed in water for 24 hours at 140° F. and judged visually as in the boiling test.

The performance of the tall oil triethanolamine esters is very similar to that of commercial tall oil fatty acid amidoamines.

TABLE VI

| | | % Coating Retained | | | |
|---|---|---|---|---|---|
| | | Boiling Test | | Immersion Test | |
| No. | Anti-Stripping Agent | $CaCO_3$ | $SiO_2$ | $CaCO_3$ | $SiO_2$ |
| 1 | Commercial Amidoamine (A) | 90 | 98 | 60 | 90 |
| 2 | Commercial Amidoamine (B) | 80 | 90 | 60 | 90 |
| 3 | TEA/Liqrene D 1:5 | 80 | 90 | 50 | 85 |
| 4 | Liqrene D/TEA 3:1 | 88 | 90 | 65 | 90 |
| 5 | Liqrene D/TEA 4:1 | 82 | 88 | 65 | 90 |

TABLE VI-continued

| | | % Coating Retained | | | |
|---|---|---|---|---|---|
| | | Boiling Test | | Immersion Test | |
| No. | Anti-Stripping Agent | CaCO$_3$ | SiO$_2$ | CaCO$_3$ | SiO$_2$ |
| 6 | TEA/Liqro W 1:4 | 90 | 90 | 50 | 80 |

What is claimed is:

1. An asphalt composition having improved adhesion to aggregate comprising asphalt and an adhesion improving amount of an anti-stripping agent comprising an aminoester reaction product of a tall oil fatty acid and triethanolamine.

2. The asphalt composition according to claim 1, wherein said tall oil fatty acid is selected from the group consisting of linoleic acid, conjugated linoleic acid, oleic acid and elaidic acid.

3. The asphalt composition according to claim 1 wherein said anti-stripping agent is present in the asphalt composition in an amount of 0.5 to 1.5% by weight.

4. The asphalt composition according to claim 3, wherein said anti-stripping agent is present in the asphalt composition in an amount of about 1.0% by weight.

5. The asphalt composition according to claim 1 wherein said anti-stripping agent additionally comprises a tall oil fatty acid.

6. The asphalt composition according to claim 1, wherein said aminoester reaction product is produced by a substantially anhydrous esterification reaction between a tall oil fatty acid and triethanolamine, wherein the weight ratio of tall oil fatty acid to triethanolamine added to the reaction is between about 1:1 and about 5:1 respectively.

7. In a process for preparing an asphalt composition for combination with an aggregate material, the improvement of enhancing the asphalt composition's adhesion to the aggregate material comprising adding to the composition an adhesion improving amount of an aminoester reaction product of a tall oil fatty acid and triethanolamine.

8. The process of claim 7 wherein the tall oil fatty acid is selected from the group consisting of linoleic acid, conjugated linoleic acid, oleic acid, and elaidic acid.

9. The process of claim 7 wherein the reaction product is added in an amount of about 0.5% to about 1.5% by weight.

10. The process of claim 9 wherein the reaction product is added in an amount of about 1.0% by weight.

11. The process of claim 7 wherein there is additionally added to the asphalt composition a tall oil fatty acid.

12. The process of claim 7 wherein the reaction product results from a substantially anhydrous esterification reaction of a tall oil fatty acid and triethanolamine in a weight ratio of between about 1:1 and about 5:1, respectively.

* * * * *